(12) United States Patent
Ortiz

(10) Patent No.: US 8,971,914 B2
(45) Date of Patent: *Mar. 3, 2015

(54) SYSTEMS, METHODS AND APPARATUSES FOR PROVIDING VIDEO DATA TO DATA RENDERING DEVICES FOR DISPLAY ON MULTIMEDIA VIDEO DEVICES AT THE REQUEST OF WIRELESS HAND HELD DEVICES

(75) Inventor: Luis M. Ortiz, Dallas, TX (US)

(73) Assignee: Ortiz & Associates Consulting, LLC, Albuquerque, NM (US)

( * ) Notice: Subject to any disclaimer, the term of this patent is extended or adjusted under 35 U.S.C. 154(b) by 723 days.

This patent is subject to a terminal disclaimer.

(21) Appl. No.: 12/569,739

(22) Filed: Sep. 29, 2009

(65) Prior Publication Data

US 2010/0015913 A1    Jan. 21, 2010

Related U.S. Application Data

(63) Continuation of application No. 09/887,492, filed on Jun. 22, 2001, now Pat. No. 7,630,721.

(60) Provisional application No. 60/214,339, filed on Jun. 27, 2000.

(51) Int. Cl.
| | |
|---|---|
| *H04W 24/00* | (2009.01) |
| *G07C 9/00* | (2006.01) |
| *G06Q 10/06* | (2012.01) |
| *H04L 29/06* | (2006.01) |
| *H04W 4/02* | (2009.01) |
| *H04L 29/08* | (2006.01) |

(52) U.S. Cl.
CPC ............ *G07C 9/00674* (2013.01); *G06Q 10/06* (2013.01); *H04L 63/083* (2013.01); *H04L 63/0861* (2013.01); *H04L 63/102* (2013.01); *H04W 4/02* (2013.01); *H04L 67/1095* (2013.01); *H04L 67/306* (2013.01); *H04L 67/04* (2013.01); *H04L 67/02* (2013.01); *H04L 67/2842* (2013.01); *H04L 67/18* (2013.01); *H04L 67/289* (2013.01); *H04L 69/329* (2013.01)
USPC ................... 455/456.1; 455/456.2; 455/456.3; 342/357.43

(58) Field of Classification Search
USPC ................ 455/456.1–456.3, 404.2, 440, 457, 455/556.1; 700/11; 375/133; 348/158, 155; 386/239; 342/357.43–357.44; 725/116; 710/305
See application file for complete search history.

(56) References Cited

U.S. PATENT DOCUMENTS

| | | | | |
|---|---|---|---|---|
| 5,428,388 | A | * | 6/1995 | von Bauer et al. ............ 348/155 |
| 5,793,630 | A | * | 8/1998 | Theimer et al. ................. 700/11 |
| 6,037,991 | A | * | 3/2000 | Thro et al. ..................... 725/116 |
| 6,377,818 | B2 | * | 4/2002 | Irube et al. .................. 455/556.1 |

(Continued)

*Primary Examiner* — MD S Elahee
(74) *Attorney, Agent, or Firm* — Luis M. Ortiz; Ortiz & Lopez, PLLC

(57) ABSTRACT

Provide dare methods, systems and apparatuses for data brokering between hand held wireless devices (WDs) and data rendering devices (DRDs). DRDs in the form of multimedia devices used for displaying video data (e.g., televisions, video monitors, and projectors) are provided with video for display at the DRD at the request of WDs. DRDs are capable of receiving video data from a network at the request of a WD and/or directly from a WD as the host and then displaying the video data on including multimedia video devices capable of displaying video data. DRD and/or multimedia video devices can also be controlled by the WD during display of video data and to control display of the video data.

20 Claims, 9 Drawing Sheets

(56) References Cited

U.S. PATENT DOCUMENTS

| | | | |
|---|---|---|---|
| 6,574,266 B1 * | 6/2003 | Haartsen | 375/133 |
| 6,990,548 B1 * | 1/2006 | Kaylor | 710/305 |
| 2002/0163578 A1 * | 11/2002 | Adair et al. | 348/158 |
| 2003/0206720 A1 * | 11/2003 | Abecassis | 386/83 |

* cited by examiner

SYSTEMS, METHODS AND APPARATUSES FOR PROVIDING VIDEO DATA TO DATA RENDERING DEVICES FOR DISPLAY ON MULTIMEDIA VIDEO DEVICES AT THE REQUEST OF WIRELESS HAND HELD DEVICES

PRIORITY TO RELATED APPLICATIONS

This application claims priority as a continuation application to allowed Nonprovisional patent application Ser. No. 09/887,492, entitled "Systems, methods and apparatuses for brokering data between wireless devices and data rendering devices" which was filed Jun. 21, 2001 and is incorporated herein by reference, and which is also a continuation of Provisional Patent Application Ser. No. 60/214,339, also entitled "Systems, methods and apparatuses for brokering data between wireless devices and data rendering devices" filed Jun. 27, 2000.

TECHNICAL FIELD OF THE INVENTION

The present invention is generally related to the use and management of video data retrieved over wireless networks. More particularly, the present invention is related to systems, methods and apparatus for providing video data to data rendering devices (DRDs) including multimedia devices capable of displaying video data (e.g., televisions, video monitors, and projectors) at the request of wireless devices. Additionally, the present invention related to DRDs and multimedia video devices is capable of receiving and displaying video data from a network at the request of a hand held wireless device and/or directly from a hand held wireless device as the host.

BACKGROUND

As a result of increased competition and the ongoing convergence of voice and data networks, new solutions and services are becoming available in the wired and wireless communications fields. Third Generation communications technology (also referred to in the art as 3G or IMT-2000), is characterized by high-speed, high-bandwidth services that will support a wide variety of wireless applications, including wireline quality voice and high-resolution video. 3G is an initiative of the International Telecommunication Union (ITU) that seeks to integrate the various satellites, terrestrial, fixed and mobile systems currently deployed and being developed under a single standard or family of standards to promote global communication service capabilities and interoperability after the year 2000

"Data" is generally known to refer to information (written, electronic, spoken, seen). As used in the communications field, data generally refers to multimedia such as voice, textual, graphics and video information transportable, generally between terminals, throughout communications networks under standards, protocols and over equipment capable of supporting and managing such data (e.g., 3G, ANSI-41, GSM, SS7, SMPP, TCP, IP). Standards and protocols exist and continue to be developed to improve wireless data communications. For example, the Short Message Peer to Peer (SMPP) protocol is an open, industry standard protocol designed to provide a flexible data communications interface for the transfer of short message data between message centers (e.g., mail servers) and a Short Message Service (SMS) application systems, such as a Wireless Application Protocol (WAP) proxy server, Email gateway or other messaging gateways.

Wireless computing devices (generally known as mobile or cellular phones, smart phones, and laptops) are available that communicate wirelessly through data networks (including cellular digital wireless networks). Many wireless telephones are "Web-enabled." Hand held wireless devices transmit and receive digital data and are referred to as Personal Digital Assistants ("PDAs", with similar devices being referred to as palm or pocket computers). Wireless networks are continuing to be expanded and integrated with new applications and services that are compatible with the growing number of wireless devices entering the marketplace.

Network interconnection (connecting one communications network with another) and interoperability (ability of a network to operate with other networks) are becoming even more robust and standardized methodologies in the communications industry. An Integrated Digital Enhanced Network (IDEN) is an example of an enhanced specialized mobile radio network and technology that combines two-way radio, telephone, text messaging and data transmission into one network, reflecting the ease of interconnection between networks. General Packet Radio Services (GPRS) data transmission technology is optimized for "bursty" datacom services such as wireless Internet/intranet and multimedia services. Also referred to as GSM-IP, it enables the connection of wireless device users directly to Internet Service Providers (ISPs). Another complementary service is High Speed Circuit Switched Data (HSCSD), which is well suited for real-time services and transferring larger amounts of data, such as video-based services. Into the GPRS solution has been introduced two new network nodes—the SGSN and the CGSN. SGSN tracks packet capable mobile locations, performs security function and access control. GGSN interfaces with external packet data networks to provide the routing destination for data to be delivered to a wireless device and to send mobile-originated data to its intended destination. The GGSN is connected with SGSNs via an IP-based GPRS backbone network. The trend for the wireless industry is towards an all-IP platform, which unites different standards for wireless services worldwide, and introduces an open, Internet-based platform for integrated data, voice and video services over cellular networks.

Wireless Intelligent Networks (WIN) are generally known as the architecture of the wireless switched network that allows carriers to provide enhanced and customized services for mobile telephones. Intelligent wireless networks generally include the use of mobile switching centers (MSCs) having access to network servers and databases such as Home Location Registers (HLRs) and Visiting Location Registers (VLRs), for providing applications and data to networks, service providers and service subscribers (wireless device users). Local number portability allows wireless subscribers to make and receive calls anywhere, regardless of their local calling area. Roaming subscribers are also able to receive more services, such as call waiting, three-way calling and call forwarding. A HLR is a database that contains semi-permanent mobile subscriber (wireless device user) information for wireless carriers' entire subscriber base. HLR subscriber information includes identity, service subscription information, location information (the identity of the currently serving VLR to enable routing of communications), service restrictions and supplementary services/information. HLRs handle SS7 transactions in cooperation with Mobile Switching Centers and VLR nodes, which request information from the HLR or update the information contained within the HLR.

The HLR also initiates transactions with VLRs to complete incoming calls and update subscriber data. Traditional wireless network design is based on the utilization of a single HLR for each wireless network, but growth considerations are prompting carriers to consider multiple HLR topologies.

The VLR is also a database that contains temporary information concerning the mobile subscribers currently located in a given MSC serving area, but whose HLR is elsewhere. When a mobile subscriber roams away from the HLR location into a remote location, SS7 messages are used to obtain information about the subscriber from the HLR, and to create a temporary record for the subscriber in the VLR. Signaling System No. 7 (referred to as SS7 or C7) is a global standard for telecommunications. In the past the SS7 standard has defined the procedures and protocol by which network elements in the public switched telephone network (PSTN) exchange information over a digital signaling network to affect wireless and wireline call setup, routing, control, services, enhanced features and secure communications.

Wireless location based services deployed on wireless networks enable wireless service providers to utilize information regarding the geographic location of wireless devices/callers to provide public safety (e.g., E-911), location-sensitive billing, location-specific information (e.g., advertising) and tracking services. For example, automatic number identification (ANI) and automatic location information (ALI) of a wireless phone is being used together with user location information when a wireless telephone user contacts a 911 call center. With the combination of Global Positioning System (GPS) and HLR technology, user identification and location information makes it easier and faster for police and rescue services to locate someone in distress who is calling from a wireless phone. GPS can be incorporated into wireless systems for use in applications such as personal tracking, navigation and automatic vehicle location technologies.

Enhanced messaging applications have also been developed in response to the convergence of voice and data networks and improving wireless technology. Unified Messaging solutions allow carriers and Internet service providers to manage customer e-mail, voice messages and fax images and can facilitate delivery of these communications to PDAs, telephony devices, pagers, personal computers and other capable information retrieval devices, wired or wireless.

Improved operating systems and protocols allow Graphical User Interfaces (GUIs) to provide an environment that displays user options (e.g., graphical symbols, icons or photographs) on a wireless device's screen. Extensible Markup Language ("XML") is a currently available standard that performs as a universal language for data, making documents more interchangeable. XML allows information to be used in a variety of formats for different devices, including PCs, PDAs and web-enabled mobile phones. XML enables documents to be exchanged even where the documents were created and/or are generally used by different software applications. XML has been shown to effectively enable one system to translate data that another system sends. As a result of data transfer improvements, wireless device GUIs are becoming able to render images that closely represent the imaging capabilities available on desktop computing devices.

Security of data during its transmission over wireless devices has become a growing concern. Improved encryption and user verification technologies enhance fraud prevention with respect to data transmission over networks.

Other examples of advancements within the field of wireless communications include the following: The Wireless Internet is generally known as an RF-based service that provides access to the Internet (e.g., WiFi), e-mail and/or the World Wide Web via wireless devices. Wireless IP generally refers to the packet data protocol standard for sending wireless data over the Internet. Wireless LANs (Local Area Networks) are known to utilize wireless transmissions, such as radio or infrared communication instead of phone lines or fiber-optic cable, to connect to data devices. A Wireless PBX is a combination of equipment that allows employees or customers within a building or limited area to use wireless handsets connected to an office's private branch exchange system.

BRIEF SUMMARY OF THE INVENTION

Although hand held wireless device users are being provided with growing services, applications and multimedia support via access to numerous data networks (wired and wireless), solutions for rendering video data provided by, or otherwise retrieved through, networks using wireless apparatuses were severely limited, or practically nonexistent, at the time of the present applications priority date of Jun. 27, 2000. Wireless device users were generally restricted in all data use by small device-based viewers, limited GUI functionality and unavailable or inconveniently located rendering (e.g., printing/display/retrieval) resources to utilize data retrieved through networks.

What was needed then and continues as a need as a result of increased public reliance on wireless data services and the desire for portability" and "information on the go" are new and improved systems, methods and apparatuses for rendering data retrieved through/with wireless devices and otherwise managed by wireless devices. It is believed that various aspects and features of the present invention disclosed in June 2000 addresses some of the developing needs of wireless user and the wireless industry, in particular with respect to managing and rendering video data. It is therefore an object of the present invention to provide methods, systems and apparatuses for data brokering between wireless devices (WDs) and Data Rendering Devices (DRDs). More particularly, it is a feature of the present invention related to systems, methods and apparatus for providing multimedia devices used for displaying video data (e.g., televisions, video monitors, and projectors) at the request and/or under the direction of wireless devices (e.g., PDAs, smart phones, and other data and video enabled handheld devices). Additionally, it is a feature of the present invention to provide multimedia video devices capable of receiving and displaying video data from a network at the request of a hand held wireless device and/or directly from a hand held wireless device as the host.

DRDs can generally be considered "undedicated" rendering devices (e.g., "unassigned" as a resource and/or generally available and open to the acceptance and rendering of data from unfamiliar users). DRDs can be located generally throughout an enterprise or private campus, or be distributed throughout communities for accessibility by the public. DRDs can be publically available or private and are locatable by and can be associated with WDs given systems and method of the present invention.

In accordance with a feature of the present invention, DRDs can receive data directly from WDs and/or through networks after/with coordination by WDs with networks providing data to DRDs.

In accordance with another feature of the present invention, DRDs can be adapted for facilitating direct wireless communication with a WD utilizing IR and/or RF communication signals.

In accordance with another feature of the present invention, the DRD methods can be included in DRD adapted/network-enabled video-enabled monitors, televisions, projectors, and other multimedia-enabled devices.

In accordance with another feature of the present invention, a WD can be used to locate a DRD based on a WD and/or WD user's location.

In accordance with another feature of the present invention, user/WD location information can be determined/provided via networks in communication with a user/WD, and DRD location information can be provided to user/WD via the networks based on user/WD location and/or profile.

Another feature of the present invention allows the network to verify DRD availability (e.g., operational readiness).

Another feature of the present invention can provide users with pass code protected retrieval of data from the DRD. Passcode capabilities can include the use of passwords/passcodes, biometrics and/or communications security (COMSEC).

Another feature of the invention provides for temporary memory at DRDs for storing rendering data. Temporary memory can be cleared/zeroed to irreversibly purge data from DRDs after use.

Another feature of the present invention provides simultaneous display of data at DRDs and WDs.

In accordance with another feature of the present invention simultaneous display of data can be provided at a DRD by more than one WD.

In accordance with another feature of the present invention, manipulation of data displayed on a DRD is carried out by at least one WD.

In accordance with another feature of the present invention, a WD can be programmed with IR and/or RF signals and/or associated functionality.

Another feature of the present invention provides more than one transmitting/receiving capability at WDs to enable simultaneous data retrieval from networks and/or DRD communication with WDs.

Another feature of the present invention provides payment/billing methods and systems associated with use of DRDs.

Another feature of the present invention enables more than one WD user to interact with a DRD simultaneously, wherein dedicated computing capability enables multiple WD users to interact with each other and/or displayed data and/or project independent data.

The novel features of the present invention will become apparent to those of skill in the relevant art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope of the invention will become apparent to those of skill in the relevant art from the detailed description of the invention and claims that follow.

BRIEF DESCRIPTION OF THE DRAWINGS

The accompanying figures, in which like references numerals may refer to identical or functionally-similar elements throughout the separate views are incorporated in and form part of the specification, further illustrate aspects of the present invention and, together with the detailed description of the invention, serve to better explain the principles of, but are not intended to limits the present invention.

DETAILED DESCRIPTION OF PREFERRED EMBODIMENTS

Particular configurations discussed in these non-limiting examples can be varied and are cited merely to illustrate at least one preferred embodiment of the present invention and are not intended to limit the scope of the invention.

In accordance with the following disclosure of the present invention, data generally refers to text, voice, graphics and/or video. Data rendering generally refers to the printing, displaying and/or retrieval of data. Wireless Devices (WD) include mobile phones, PDAs, pagers and other hand held wireless appliances adapted for connectivity to wireless networks and capable of processing data. A Data Rendering Device (DRD) includes data rendering hardware (e.g., printers, copiers, displays, etc.) and multimedia software adapted for rendering data at the request and/or coordination of what can be a previously unknown WD. DRDs can receive data directly from WDS and/or through networks (e.g., wireless, Internet, intranet, etc.) after/with coordination by WDS with networks providing data and support to DRDs. Data Brokering includes the negotiation, management, coordination and/or facilitation of data movement and use between and throughout DRDs, WDS and networks.

Figure 1:
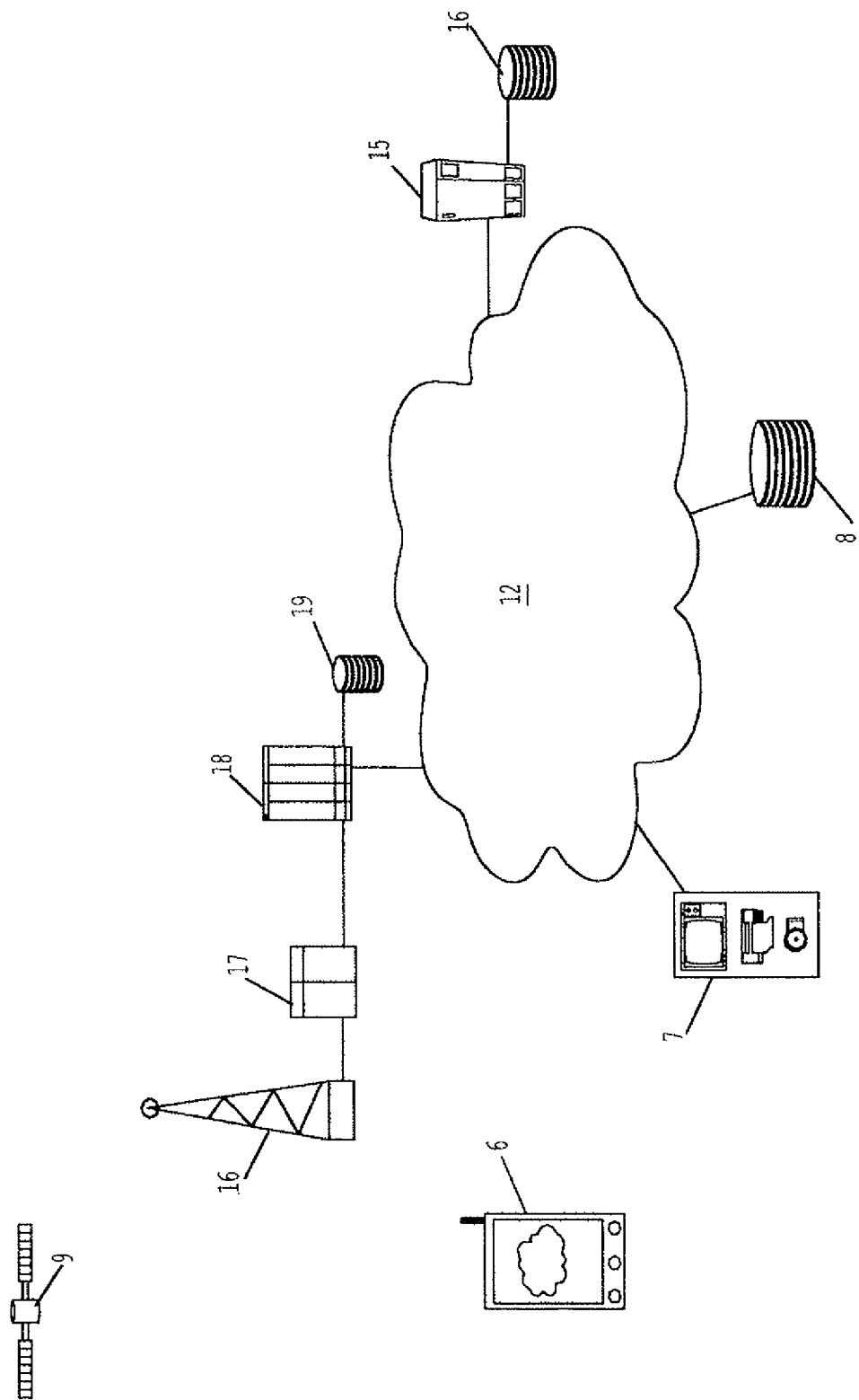
FIG. 1 is an exemplary illustration of an environment wherein aspects of the invention described herein can be deployed.

Referring to FIG. 1, an environment is illustrated as an example wherein aspects of the invention described herein can be deployed. An aspect of the present invention provides methods, systems and apparatuses for data brokering between wireless devices (WDS) 6 and Data Rendering Devices (DRDs) 7. Data brokering can be carried out directly between WDS 6 and DRDs 7 via local wireless communications including infrared (IR) or radio frequency (RF) technology and/or indirectly via networks 12 through the use of known networking and data formatting protocols. Information related to WDS 6, DRDs 7 and/or WD user's (e.g., subscriber identification, location, accounting, profiles) can be managed by a combination of network servers 15, Home Location Registers (HLRs) 16 and Visiting Location Registers 19. Subscriber information for a WD user can be kept in at least one HLR 13 and/or VLR 19, but can also be generated by the WD 6 (e.g., stored in the WD or provided together with a network request by WD user). Subscriber information can include a profile regarding DRD usage (e.g., restriction regarding geography, hardware capabilities, security, biometrics, etc). A WD 6 user is typically in communication with a supporting network 12 through wireless network communications hardware such as cellular antennas 16, Base Station Controllers (BSCs) 17 and Mobile System Controller (MSCs) 18. A copy of a WD 6 user's subscription information can be kept in a VLR 19 associated with the area and MSC 18 the user is operating during communication. Satellite global positioning system (GPS) 9 capabilities installed at the wireless network interface can assist in determining a WD 6 user's location by routing location information to the VLR 19/HLR 13 when a WD user communicates with a supporting wireless network 12. A WD 6 user will generally retrieve data from multimedia database resources 8 available or accessible to the WD and WD user over networks 12. Examples of multimedia resources include messaging mailboxes and Internet/intranet information.

Figure 2:
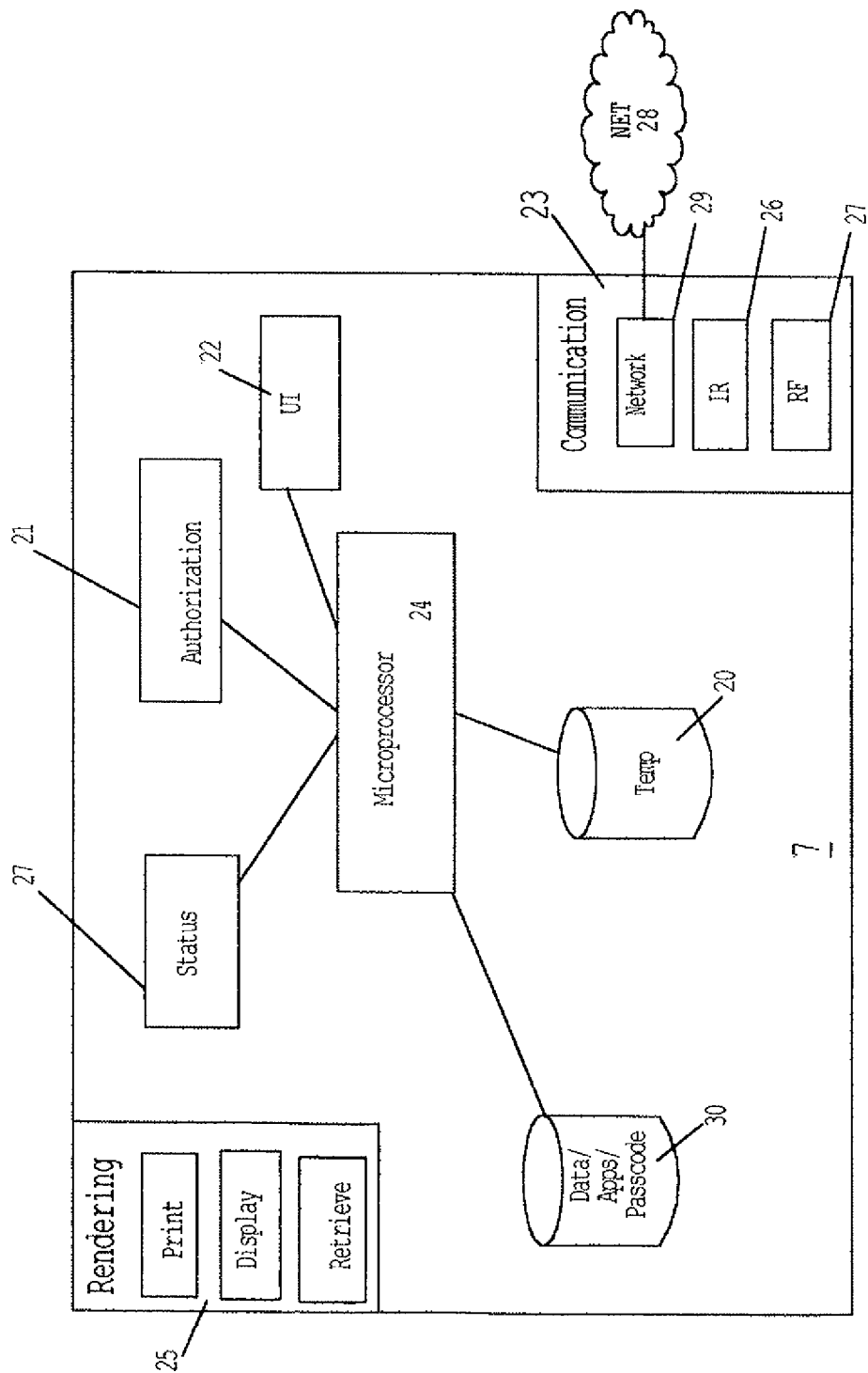
FIG. 2 is a block diagram illustrating components that can be included in a data rendering device (DRD) in accordance with aspects of the present invention.

In accordance with another aspect of the present invention data brokering can be accomplished directly between WDs and DRDs (e.g., locally via infrared (IR) or radio frequency (RF) technology) or can be negotiated with and provided through networks using available networking protocols. Referring to FIG. 2, a block diagram of some of the components that can be included in a DRD 7 is provided. A DRD 7, serving as an apparatus adapted for rendering data associated with a data rendering request issued by a WD 6, includes an authorization module 21, communications means 23, rendering means 25, and a microprocessor 24. The authorization module 21 approves receipt of rendering data in accordance with a request initiated by a WD 6. The authorization module 21 can approve or deny the request to render data based on the DRDs 7 readiness status 27. A status monitor 27 can be provided to track the operational readiness of the rendering means 25 (which can include printing, display and retrieval hardware status, and microprocessor 24 load/communications activity). The communications means 23 can provide a DRD 7 with wired and/or wireless communications with networks 28 and/or wireless devices (as generally described and illustrated in FIG. 1 and as further known in the wireless communications art). Wired communication via communications means 23 can occur through known data network communications hardware, methods and protocols (e.g., cable modems, Ethernet, Bluetooth, etc.). Wireless communication via communications means 23 can occur through known wireless data network communications hardware, methods and protocols (e.g., Bluetooth, WLAN, 802.11b, etc.). The network communications means 28 can provide DRD 7 communication capabilities over, for example, the public service telephone network (PSTN), digital subscriber line (DSL), Integrated Services for Digital Networks (ISDN) and/or Local Area Network (LAN). A DRD 7 can also communicate with networks via wireless means (e.g., cellular, satellite, microwave, etc.) A user's direct interaction with a DRD 7 can be provided through a user interface (UI) 22 associated with the DRD 7. The UI 22 can allow users to control (e.g., manage) and manipulate (e.g., interact with) data at the DRD 7. The UI 22 can be used to provide user passcodes (including biometrics) directly to the DRD 6 in order to receive rendered data from the DRD 7. Alternatively, a user can interact directly with the DRD 7 via a WD 6. A WD 6 can provide commands and/receive data from the DRD 7 through IR and RF means. IR and RF data transport and communication hardware and protocols are known in the art and can be used for local communication between WDS 6 and DRDs 7. Memory 30 is also available at the DRD 7 to store applications, data, DRD profile information, passcode-related tools and other information and tools necessary for the DRD 7 to operate and communicate. The microprocessor 24 provides management and control over the DRD 6 and its components. Management and control over the DRD 7 and data can be through the UI 22 and/or WD 6.

DRDs 7 can be easily locatable using network 28 resources and/or WDs 6. Information related to a DRD's physical location and rendering capabilities, for example, can be registered at network 28 resources (e.g., an HLR) supporting network communication with the DRD 7. DRD information regarding capabilities can also be held within DRD memory 30 for retrieval by the network and/or WD 6. In accordance with this aspect of the present invention, WD proximity-based DRD locating/finding technology should enable WD users to locate available DRDs 7 based on a DRD's 7 proximity to the a roaming WD's location (e.g., determinable by GPS) and/or profile information. Profile information related to the DRD 20 can be provided from memory 30 at the DRD 20 and/or through the network 28. User/WD 6 location information can be determined via networks in communication with the user's WD 6. The user can choose to render data at the DRD 7 suggested by the network. Several DRDs can be identified by the network 28 for selection by the WD user. DRD brokering and location functionality can be included in familiar rendering devices (e.g., Internet Kiosks, printers, photocopiers, fax machines, automatic teller machines (ATMs), video monitors, projectors used in conference rooms and other multimedia-enabled devices) that are IR, RF and/or network communication enabled. DRDs can be public or exclusive to an enterprise. Other DRD compatible devices are foreseeable given the various aspects of the present invention taught herein.

Figure 3:
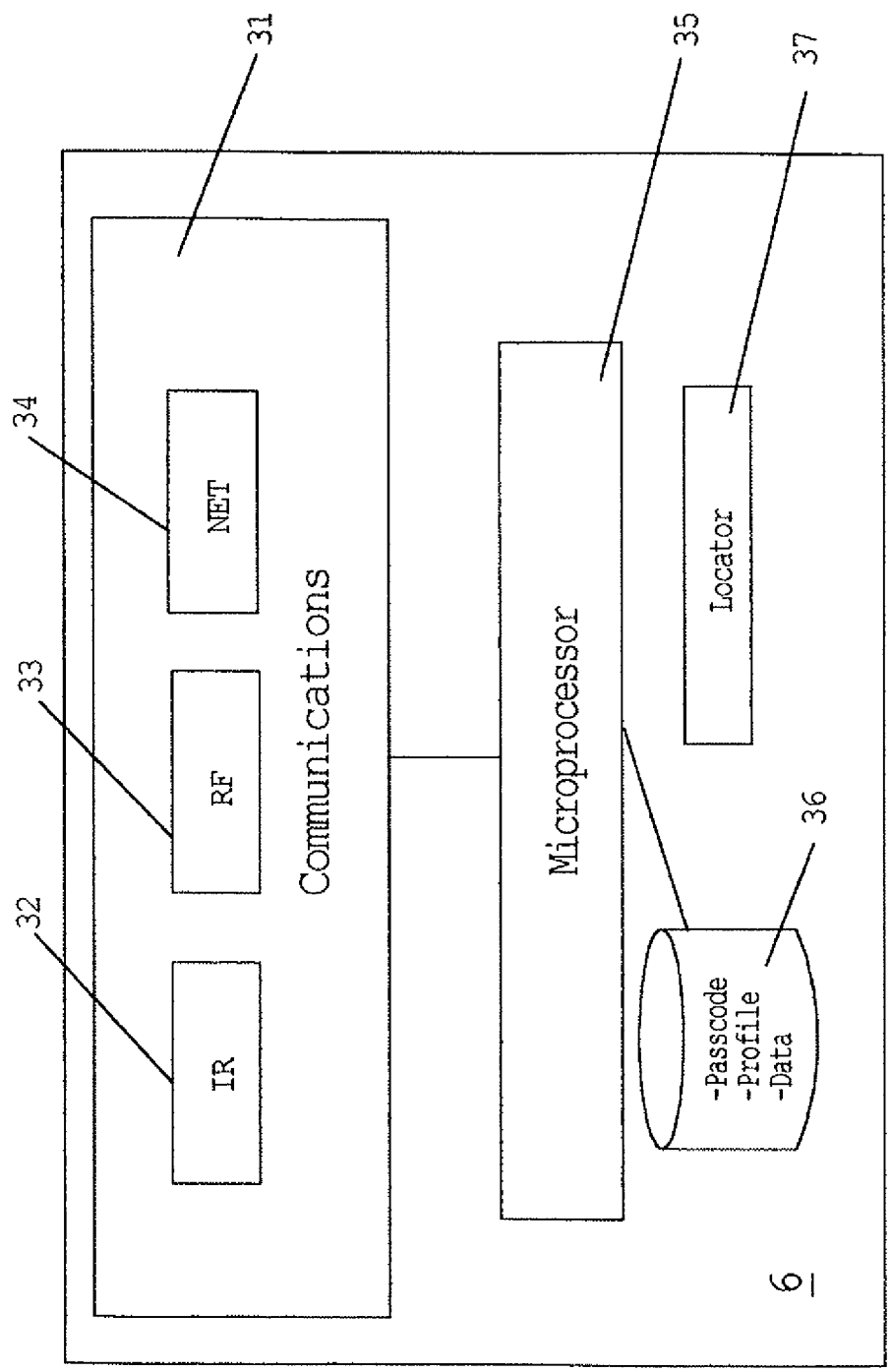
FIG. 3 is a block diagram illustrating components that can be included in a wireless device (WD) in accordance with aspects of the present invention.

A block diagram of some of the components that can be included in a WD 6 are illustrated in FIG. 3. Referring to FIG. 3, a WD 6 will include a communications means 31, microprocessor 35, and memory 36. The communications means can include IR 32, RF 33 and mobile network RF communications modules 34. The WD 6 can have a broad RF 33 and/or IR 32 signal recording/learning capabilities under the control of the microprocessor 35 utilizing the WD memory 36 for signal storage. The WD can be programmed/provided with unique control functions and/or signals applicable to a particular DRD 7 selected for use by the WD 6. Control functions can be recorded by the WD 6 memory 36 after being obtained by the communications means 31. A WD 6 can be provided with unique DRD control signals from the network or by requesting a temporary copy of DRD 7 control functionality directly from the DRD 7, in which case the DRD 7 can upload, via IR or RF communication, a copy of DRD programmable functions to the WD. It would be desirable for basic DRD functions and signaling to become standardize so that WDS and DRDs can interact with ease. WD and DRD location information can be coordinated/facilitated with the assistance of a locator module 37. The locator module 37 can be used to incorporate device-based GPS resources and/or to store locator programs and functions. The memory 36 can be used to store, for example, data, profile information, passcode information (including COMSEC) and programmable functions associated with IR and RF control over and communication with remote controlled devices (in addition to the DRD).

In addition to memorizing DRD 7 control signals and functions, a WD 6 having signal recording capabilities can be programmable to facilitate user control over other devices having wireless remote control capabilities. A WD 6 can learn device signals and functions associated with controlled devices by being programmed with applicable remote control signals. RF/IR signals can be learned and stored in WD memory and associated functionality can be assigned to optional/additional WD menu functions or UI controls. A WD can thereby be adapted to communicate with diverse remote controlled devices (e.g., secured entry (garage doors, gates, etc.), entertainment devices (games, TV, audio) and alarm control (home, vehicle).

Another aspect of the present invention can provide users with passcode protected retrieval of data from the DRD 7. The passcode can be provided to the DRD 7 prior to data rendering and/or retrieval from the network 28. The authorization module 21 can facilitate passcode interaction at the DRD 20. A user can provide passcode information at the UI 22 and/or through a WD 6. The passcode can be verified at the network 28 (e.g., HLR) or by the DRD 7 (e.g., referencing DRD memory 20). Passcode information and verification can include the use of biometrics (e.g., voice, retinal, fingerprint) and/or communication security (COMSEC) methods. Passcode control can also be provided over use of the WD 6. For example, a passcode can be required before a WD user can use the WD to communicate with and control diverse remote controlled devices as described above (e.g., controlling security alarms and secured entry devices).

Referring again to FIG. 2, a temporary memory 20 can be located at the DRD as a means for providing additional dedicated security over user data. The temporary memory 20 can be used for temporary storage of user data provided to the DRD 7 for rendering on behalf of the WD user. The memory 20 holding the data can be permanently cleared of the data (also referred to "zeroing" the memory) through methods known in the art (e.g., electrical potential used to clear electronic memory registers). Zeroing the memory will ensure that data can not be reused by a subsequent user of the DRD. Memory 20 can be cleared upon: termination of use by the user, after a period of time (e.g., based on failure to render data or log-off) and/or upon user selection of a memory clearing operation at the DRD.

Methods of communications security (COMSEC) can also be incorporated into the DRD 7 to provide secure retrieval/use of data. Using encryption/decryption (also referred to as cryptography or "Crypto") methods, a user can be required to provide a DRD 7 with decryption codes to render data. Encryption/decryption coding can be provided by the network 28 (service provider) with data being transmitted at the request of the WD 6. The network 28 can generate data in encrypted form and provide the encrypted data to the DRD 7 through the network 28. The network can also provide the WD 6 (e.g., can be stored in WD memory 36) with decryption codes needed to render encrypted data at the DRD 7. The user can transmit decryption codes to the DRD 7 directly via the WD 6 (e.g., IR or RF transmission).

Another aspect of the present invention provides simultaneous display of data at DRDs and WDs. Such capability can be most relevant where WDs and DRDs possess compatible display technologies. In accordance with simultaneous display, another aspect of the present invention enables WD 6 control and/or manipulation of data displayed on a DRD 7. WD 6 control can be provided via IR/RF communication with a DRD. The WD 6 can host the networks retrieval of data for redisplay on DRD 7 via simultaneous WD-DRD communication (e.g., IR and/or additional RF capacity) and/or WD-network communication via cellular RF capability. Simultaneous network and DRD communication by the WD 6 would be possible where more than one RF transmitter/receiving capability can be provided with the WD 6 (as shown in FIG. 3).

Another aspect of the present invention provides a payment mechanisms and/or billing methods associated with DRDs. Payment mechanisms can be incorporated at the DRD 7 and managed by the microprocessor 24 and authorization module 21. A DRD 7 can accept currency and/or provide for electronic debits (e.g., e-money, account debits, etc.) through the payment mechanism. For example, an ATM machine can provide DRD capabilities and allow users to be billed a transaction fee via bank account cards (e.g., ATM, Debit and Credit cards). Another public device that can provide DRD capabilities are public telephones, which can allow users to make rendering related transaction payments via payment mechanisms or be billed via communication service accounts or arrangements. The DRD can also authorize operations through billing arrangements (e.g., prepaid services). DRD services/capabilities do not have to be billed to a WD/DRD user in company environments where the users and/or WD is recognized, by the network and/or DRD, as an authorized member of an organization. An example of a device that is generally available throughout large organizations and that can be suitable for DRD applications is a photocopier.

Another aspect of the present invention can enable office hardware such as photocopiers, printers, PCs, monitors, multimedia projectors, and TV monitors to be incorporated with DRD methodologies described herein. For example, presentation projectors typically used in conference room scenarios are already generally capable of being connected to laptops for the purpose of displaying electronic information. DRD compatible software and hardware can be integrated within and/or connected to a multimedia projector to enable a WD to display data via the projector. Another aspect of the presentation in such a setting would allow several WD users to interact with the DRD simultaneously. Simultaneous, multi-WD user interaction together with dedicated computing capability can enable conference participants to interact with each other and displayed data and/or project independent data for comment by participants. In accordance with another aspect of the present invention, computing capability necessary to host a multi-WD user session with a DRD can be provided via networked or dedicated DRD processing capabilities (e.g., a host computer or network connection to the DRD) or via a user's WD acting as the host of the multi-WD session. The host could generally be responsible for presenting the data (e.g., the image of interest to the audience) and selectively archiving participant changes and/or multi-WD interaction with the data.

Figures 4, 5:
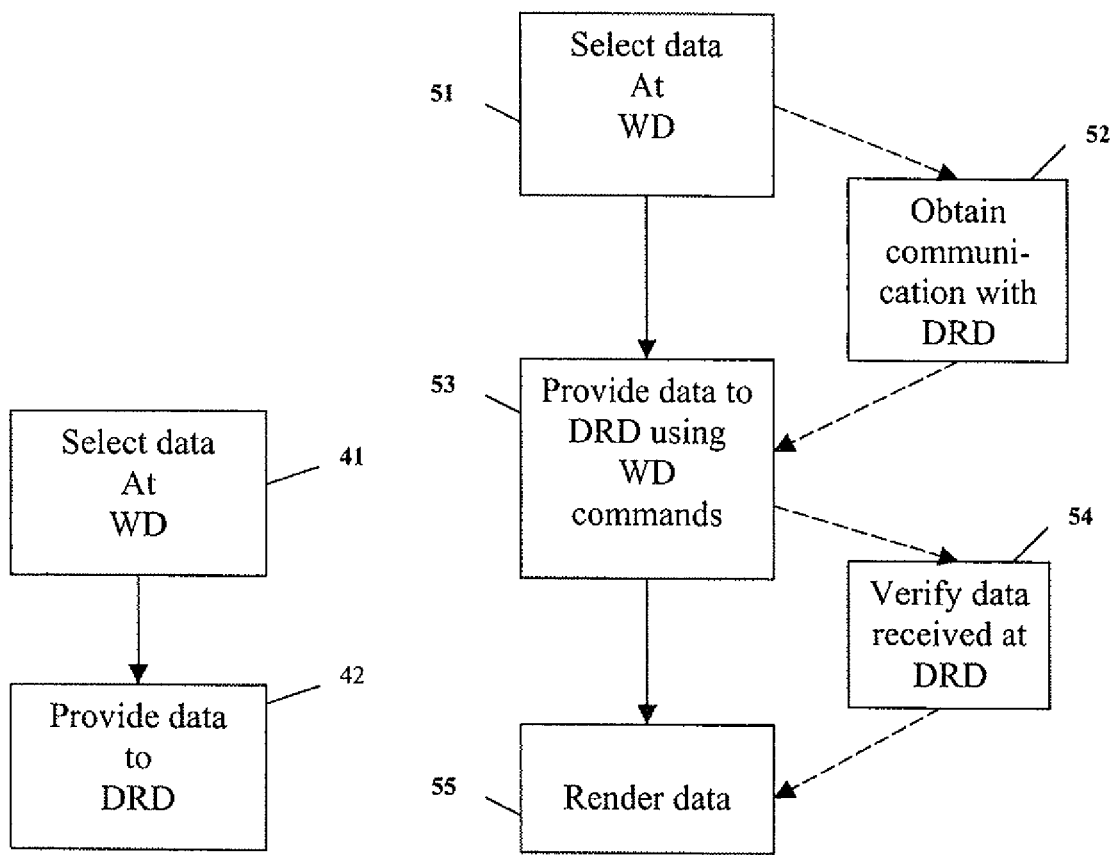
FIG. 4 is a flow diagram illustrating steps by a WD for selecting and providing data to a DRD.
FIG. 5 is a flow diagram illustrating additional steps of a WD for providing data to a DRD for rendering by the DRD.

In accordance with aspects of using the present invention methods of use will now be described. Referring to FIG. 4, a WD user can generally render data at an unassigned DRD by selecting data for rendering using a WD 41 (e.g., through the WDs associated UI). Once data has been selected, the user issues a command at the WD to provide data 42 to the DRD. Data can be provided directly to the DRD by the WD, or via a network supporting the WD.

Referring to FIG. 5, when a WD is providing data directly to a DRD (e.g., via IR or RF communications) some additional steps can be required by the WD prior to providing data to the DRD. After the user selects data at the WD 51, but before data is provided to the DRD 53 at the direction of the WD, the WD achieves communication with the DRD 52. Once communication has been established 52, the WD provides the DRD with data 53. The DRD can verify to the WD 54 that it received the data. The DRD then renders the data 55 after it is received (generally at the command of the user).

A WD user can generally invoke the services of any DRD, public or private, using methods of WD, DRD and Network interaction further described below. A WD user can render the data directly at the DRD if its location is known to the user, or the user can request networks in communication with the WD for assistance in locating an appropriate DRD. DRD location can be based on the user's location or a user's (or hand held wireless device's) proximity to DRDs (known because of location in close proximity to the DRD (as in the same room), or determinable by the network or WD) and/or can be based on user requirements provided to the network or embodied in a WD user profile.

Figures 6, 7:
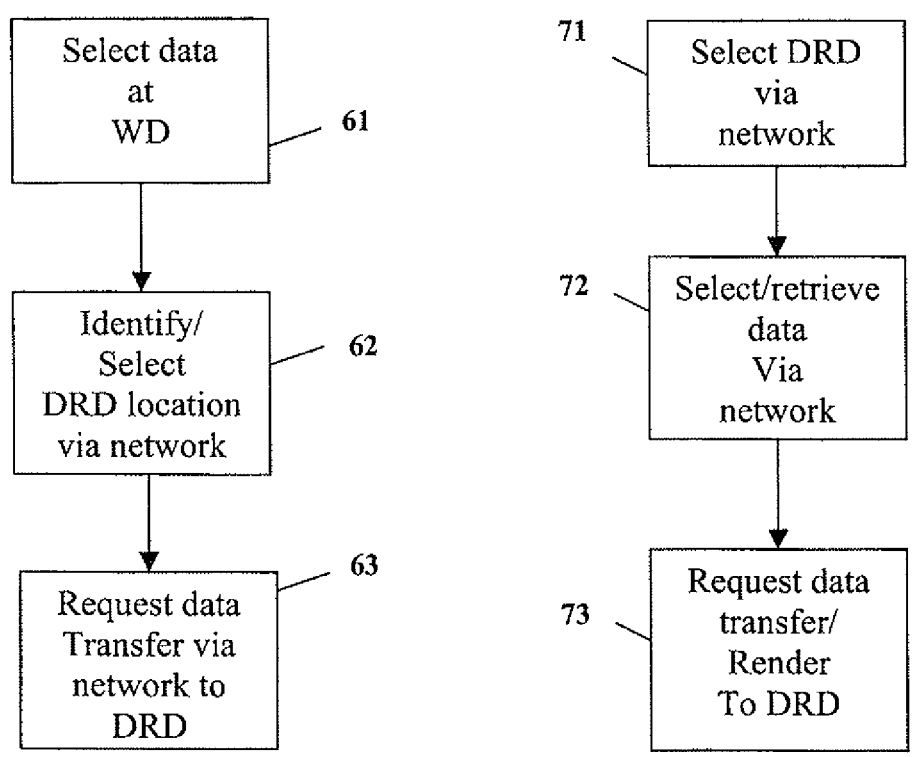
FIG. 6 is a flow diagram illustrating steps by a WD for selecting a DRD for transfer of data.
FIG. 7 is a flow diagram illustrating steps by a WD for selecting a DRD using network resources, selecting data for transfer to/rendering by a selected DRD and requesting data transfer/render to the selected DRD.

Referring to FIG. 6, a user selects data for rendering at a WD 61. If the user does not know the location of a DRD, the user can request network assistance in identifying the location and/or capabilities of a DRD 62. Once an acceptable DRD has been selected, the user can request the network to transfer the data to the DRD 63. Referring to FIG. 7, the WD can first be used by the WD user to request network assistance in locating an appropriate DRD 71. After the DRD has been located 71, data for rendering can be selected at the WD 72 and the network requested to transfer the data to the DRD 73.

Figures 8, 9:
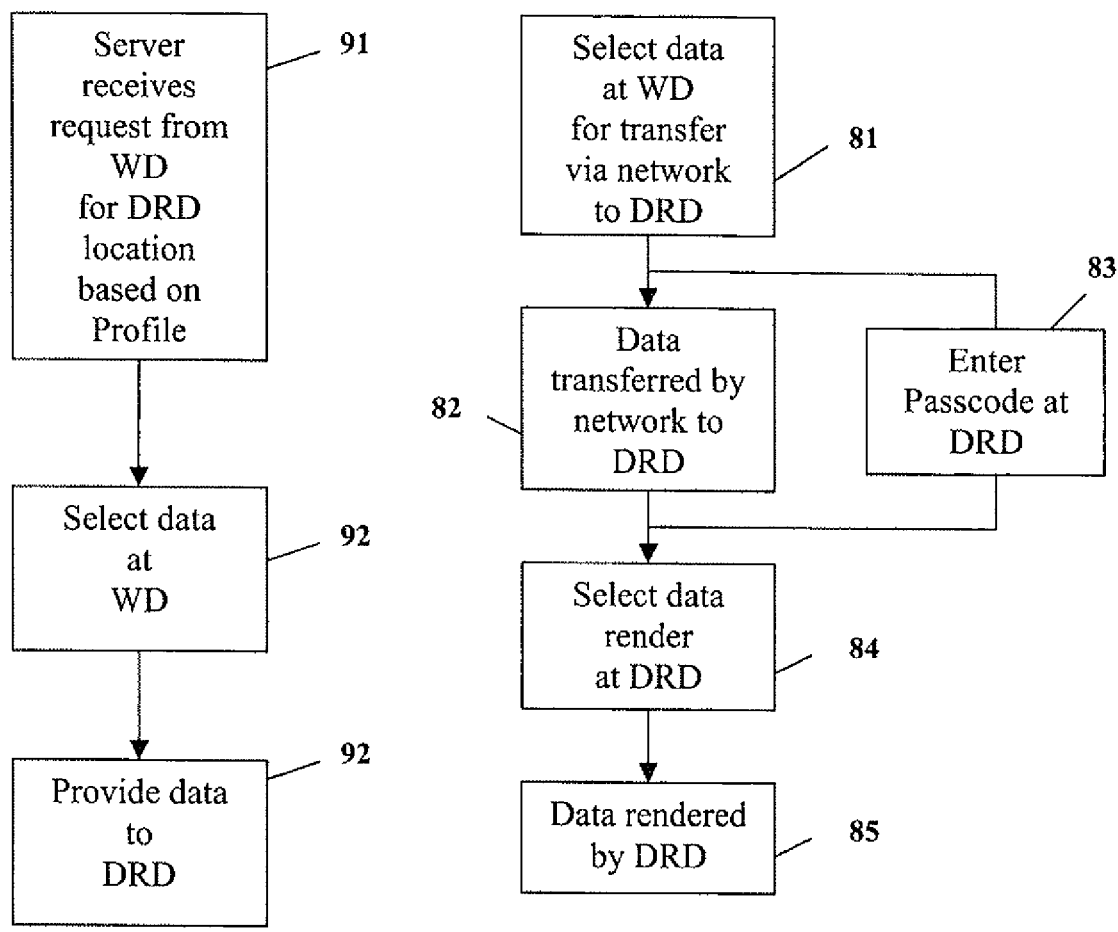
FIG. 8 is a flow diagram illustrating steps for a WD/user to select a DRD for data transfer via a network and selecting render functions at a DRD.
FIG. 9 is a flow diagram illustrating steps by a network server in processing a request for DRD location information.

Prior to actual transmission of data to the DRD, the DRD can require security passcode (e.g., including any of: passcode, biometrics and/or COMSEC) for transfer and rendering to occur. The WD device user can provide the passcode at the DRD's physical location prior to data transfer and rendering. Referring to FIG. 8, data is selected at the WD for transfer to a DRD via networking 81. Data is then transferable to the DRD via network 82. Although data can be transferred and eventually rendered at the DRD 84 without a passcode, a passcode can be required 83. The passcode can be entered at the DRD prior to data transfer 82, or prior to data rendering 84 at the DRD. If a passcode is required, data will be rendered by the DRD 85 after the passcode has been entered. The passcode can be entered using a DRD user interface or via direct (local) communication to the DRD by the WD.

When the network is requested to assist the WD in locating a DRD, the network can select a DRD for the WD based only on the WDs proximity to the DRD. The network, however, can utilize more than just a WD x, y location within a geographic region based on GPS to find an appropriate DRD for the WD. DRD selection can be based on a profile. Referring to FIG. 9, a network server can receive a request from a WD for DRD location based on a profile 91. Profile information can be located in a database (HLR) accessible to the server and/or transferred by the WD as part of the request for assistance. The profile can include new requirements issued by the user regarding locating an appropriate DRD. After the server receives the request, the server locates and identifies a DRD to the WD matching the profile 92. The server sends DRD location information to the WD 93. DRD location information can include address information, driving directions and/or a map. Such information is already available from some Internet websites providing directions/maps. With the present invention, however, the user does not have to provide known WD location information. The server can utilize WD location information known by the server (e.g., based on GPS) to generate directions and/or maps provided to the WD to locate the appropriate DRD.

Figure 10:
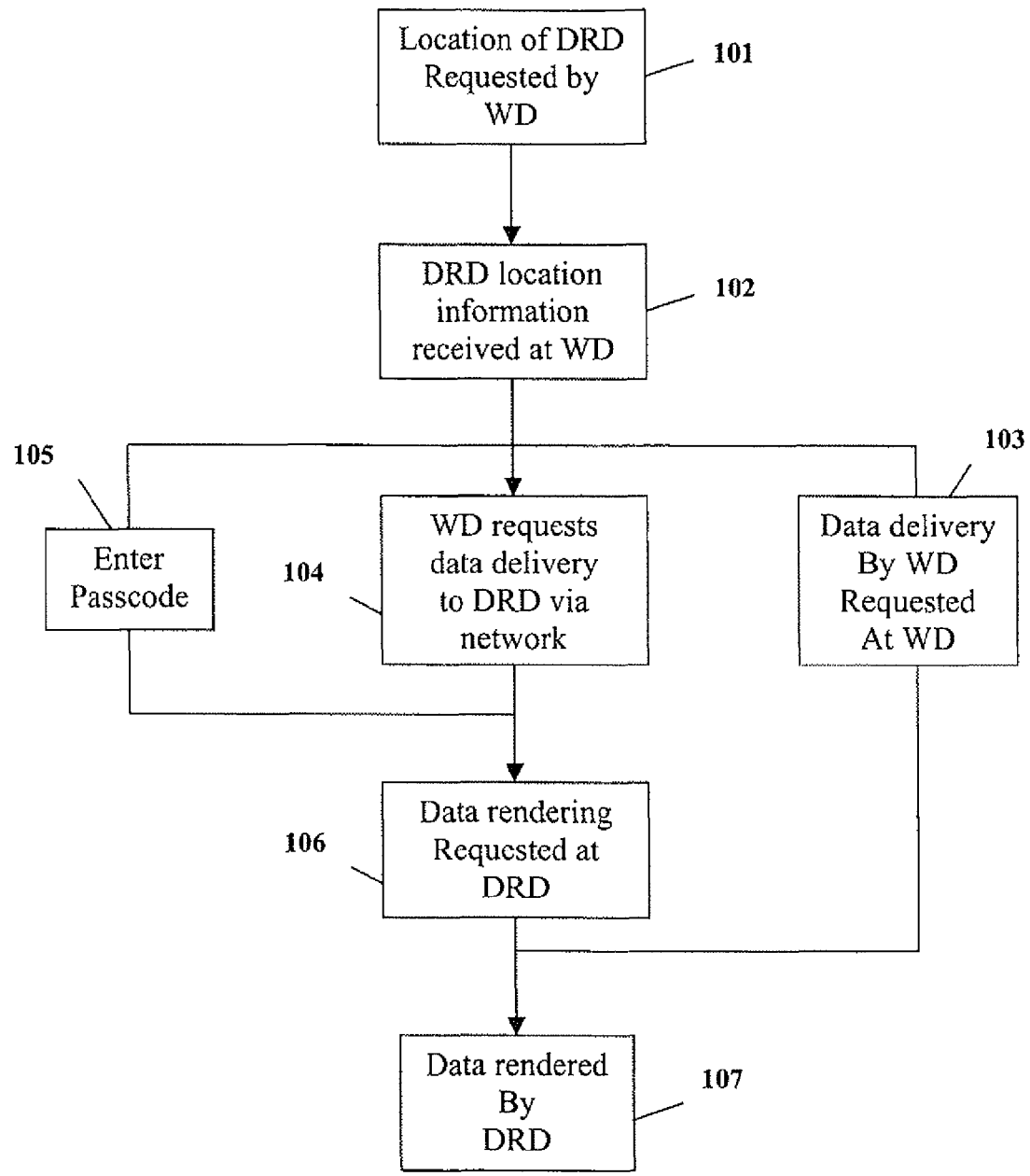
FIG. 10 is a flow diagram illustrating steps by a WD for requesting DRD location information, data transfer and data rendering.

Referring to FIG. 10, a flow diagram of DRD location and data delivery is illustrated. At the WD the user wanting to render data at a DRD can request the network to find a DRDs location 101. A network server will assist the WD as provided in FIG. 9. The WD will receive DRD location information provided by the network 102. After DRD location is determined, the WD can have data delivered to the DRD either: directly from the WD 103 after physically locating the DRD, or via a request for data delivery through the network 104. If data is provided directly from the WD to the DRD, data can be rendered by the DRD 107 after receiving the data transferred by the WD. If data delivery through the network 104 is chosen, the WD/user can be required to enter a passcode to the DRD 105 prior to receiving data delivery at the DRD 104 and/or prior to requesting rendering to the DRD 106. After the rendering request is provided 106, and appropriate passcode authorization received 105 (if applicable), the DRD renders the data 107.

Figure 11:
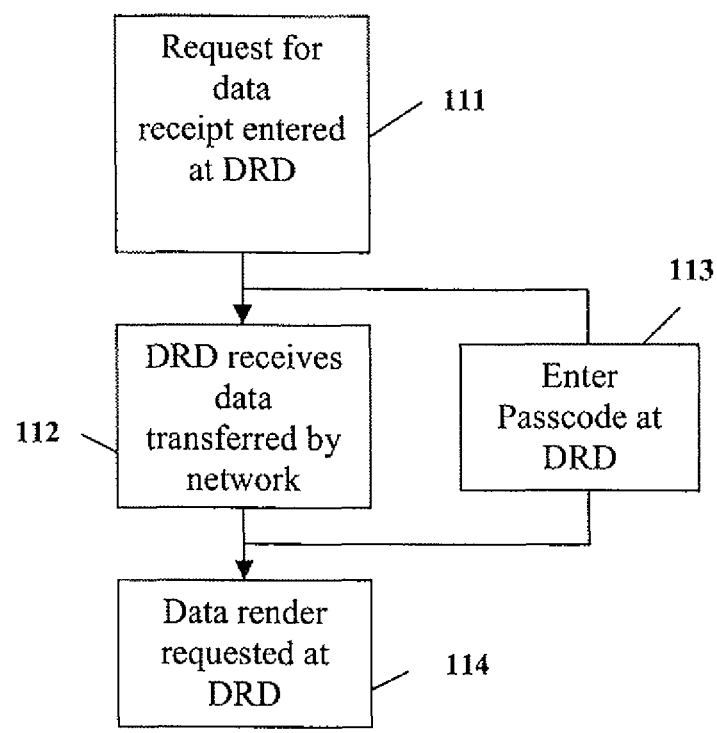
FIG. 11 is a flow diagram illustrating steps by a DRD for receiving/rendering data at the request of a WD.

Referring to FIG. 11, The DRD can be required to verify/authorize data receipt and/or rendering. The request for data receipt and/or rendering can be initiated by the WD/user at the DRD 111. The DRD can request the WD/user to enter a passcode 113 either before the DRD receives data 112, or before data is requested by the WD/user to be rendered by the DRD 114.

Figure 12:
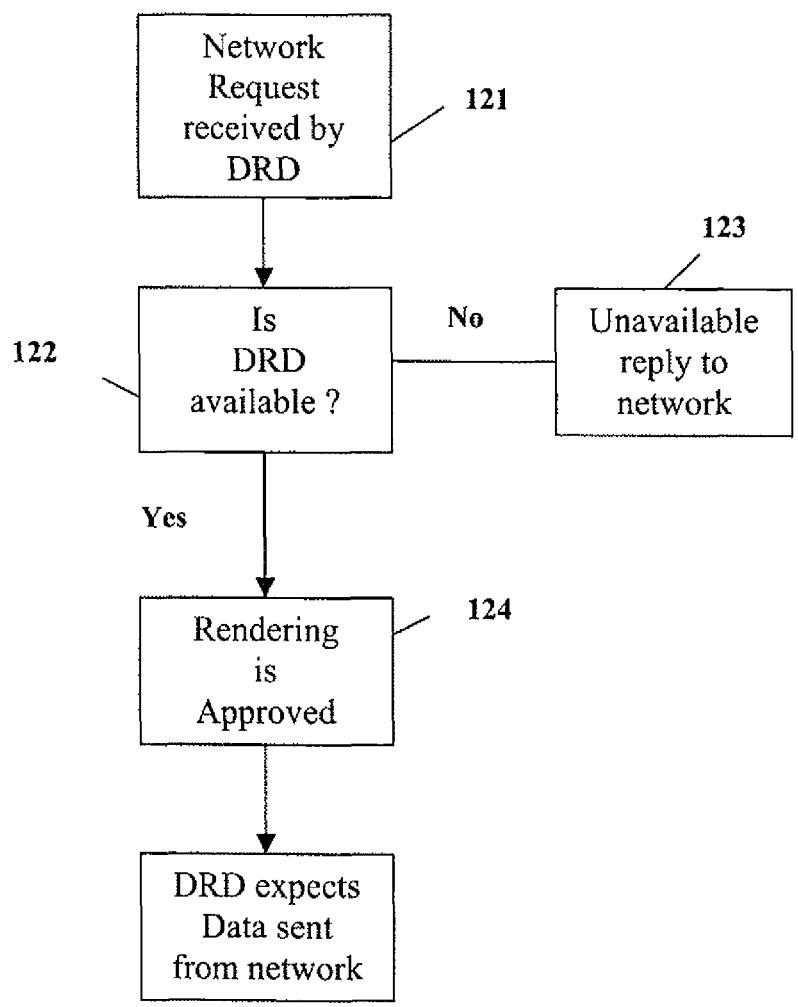
FIG. 12 is a flow diagram illustrating approval determination steps by a DRD.

Although a DRD may seem appropriate for temporary assignment to the WD/user for data rendering because of its proximity to and/or profile match with the WD/user, it may not be available for rendering. For example, a DRD may not be available for rendering because it is out of service or has already reached its schedules/queued/potential capacity for data delivery/rendering based on a report by dedicated status monitoring means at the DRD. Referring to FIG. 12, a DRD receives a network request for the DRD to receive/render data 121 associated with a WD. The DRD will verify its availability and either approve or deny delivery 122. If delivery is denied, a rejection is provided to the network 123 (e.g., to the requesting server). If the DRD accepts delivery/rendering an approval is sent to the network 124. The network can then send data to be received by the DRD 125. The DRD can then render the data in accordance with other described methods.

The embodiments and examples set forth herein are presented to best explain the present invention and its practical application and to thereby enable those skilled in the relevant art to make and utilize the invention. Those skilled in the art, however, should recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and equivalent variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A method of brokering video data between handheld wireless devices and video-enabled data rendering devices, comprising:

selecting video data from a handheld wireless device (WD) for rendering by a video-enabled data rendering device (DRD);

requesting assistance from a wireless data communications network supporting wireless communications of said WD to locate the video-enabled DRD for display of said video data;

selecting at least one video-enabled DRD identified by said wireless data communications network for rendering of said video data from at least one of said WD or a remote server associated with said WD; and providing said video data to said video-enabled DRD, after an authorization code provided by said WD is verified by said DRD, from at least one of: said WD via RF or IR transmission and said remote server via a data network supporting communication with said video-enabled DRD.

2. The method of brokering video data between wireless devices and video-enabled data rendering devices in claim 1, wherein said video data is provided to said video-enabled DRD via a network supporting said video-enabled DRD after a WD user identifies the video-enabled DRD to a network supporting said WD and a render command is provided by said WD through said network in support of said WD to at least one of a server associated with said wireless device and a network supporting said video-enabled DRD, and said network in support of said WD facilitates transfer of said video data to said video-enabled DRD from said server through said data network supporting communication with said video-enabled DRD.

3. The method of brokering video data between wireless devices and video-enabled data rendering devices in claim 1, wherein said video-enabled DRD displays said video data on at least one of a video monitor and multimedia projector after a render command is provided to the video-enabled DRD.

4. The method of brokering video data between wireless devices and video-enabled data rendering devices in claim 3, wherein displaying said video data by said video-enabled DRD on said at least one of a video monitor and multimedia projector is controlled by the WD through said data network supporting communication with said video-enabled DRD.

5. The method of brokering video data between wireless devices and video-enabled data rendering devices in claim 1, wherein said video data is provided to said video-enabled DRD for rendering and display on said at least one of a video monitor and multimedia projector directly from said WD.

6. The method of brokering video data between wireless devices and video-enabled data rendering devices in claim 5, wherein said video data is rendered by said video-enabled DRD on said at least one of a video monitor and multimedia projector after said render command is provided by said WD to said video-enabled DRD.

7. The method of brokering video data between wireless devices and video-enabled data rendering devices in claim 5, wherein said video data is retrieved from a server associated with said WD, and wherein said video-enabled DRD renders said video data on said at least one of a video monitor and multimedia projector after said video data is delivered to said video-enabled DRD.

8. The method of brokering video data between wireless devices and video-enabled data rendering devices in claim 1, wherein selecting at least one video-enabled DRD is further accomplished by:
requesting said data communications network supporting said WD to locate and communicate with at least one video-enabled DRD, wherein location of said video-enabled DRD is based upon location of said WD or a WD user location; and
requesting said network to provide said WD with at least one of identity and location information for at least one video-enabled DRD.

9. A method of providing video data to a video monitor including a display screen and connected to a data network at the request of a handheld wireless device (WD), comprising:
selecting video data using said WD for rendering by said video monitor;
entering a video monitor locator request at said WD to a wireless network supporting wireless communication by said WD;
wirelessly receiving a list of at least one of video monitor identification and location information from said wireless network at said WD for at least one video monitor;
selecting a video monitor from the list of said at least one of video monitor identification and location information received from said wireless network;
selecting video data using said WD for display on said video monitor selected by said WD from the list of at least one of video monitor identification and location information; and
providing said video data to said video monitor selected by said WD via at least one of wireless communication between said WD and said video monitor or via coordination with a remote server and said WD to provide video data to said video monitor from said remote server, after an authorization code provided by said WD is verified by said video monitor.

10. The method of providing video data in claim 9, wherein said video data is retrieved from a remote server associated with said WD.

11. The method of providing video data in claim 9, wherein said video data is provided to said video monitor from said remote server via at least one data network supporting communication of said video data to said video monitor after a request to provide said video data to said video monitor by said WD to said remote server over said wireless network also identifies the video monitor selected by said WD.

12. The method of providing video data in claim 11, wherein said remote server is also associated with said WD.

13. The method of providing video data in claim 12, wherein said video monitor renders said video data on at least one of a video monitor and multimedia projector associated with said video monitor after a render command is provided to the video monitor wirelessly from said WD via a data network also supporting said video monitor.

14. The method of providing video data in claim 9, wherein data is provided to said video monitor directly from said WD via at least RF and IR communications for rendering on said at least one of a video monitor and multimedia projector associated with said video monitor.

15. The method of providing video data in claim 10, wherein a render command is provided by said WD over said wireless network to at least one of said video monitor or a data network in support of said WD, and said data network transfers said video data to said video monitor from said remote server.

16. A method of brokering video data between handheld wireless devices and a video monitors including a display screen and access to a data network, comprising:
using a wireless network supporting a handheld wireless device (WD) including at least one of a smart phone or personal digital assistant to locate said video monitor including a display screen and access to a data network;
selecting video data for rendering on said video monitor using said WD after authorization code provided by the WD is verified by said video monitor; and
providing said video data to said video monitor selected by said WD for rendering by said video monitor selected by said WD.

17. The method of brokering data between wireless devices and video monitors including a display screen and access to a data network in claim 16, wherein data is received at said video-enabled DRD selected by said WD from a server associated with at least one of said WD and said video-enabled DRD via a data network following a command of said WD.

18. The method of brokering data between wireless devices and video monitors including a display screen and access to a data network in claim 16, wherein said rendering of data at said video monitor follows a command by said WD provided to said video monitor over a local wireless network.

19. The method of brokering data between wireless devices and video monitors including a display screen and access to a data network in claim 16, further comprising the steps of:
  determining if delivery of video data to said video monitors can be accepted by said video monitors prior to the steps of selecting video data, using a wireless device WD, for rendering by said video monitors selected by said WD and providing video data to said video monitors selected by said WD at the command of said WD for rendering by said video monitors; and
  providing said video data to said video monitors only if delivery of said video data is accepted by said video monitors.

20. The method of brokering data between wireless devices and video monitors including a display screen and access to a data network in claim 19, wherein said rendering of data by said video monitors follows a rendering command received at said video monitors by said WD.

\* \* \* \* \*